Figures 1, 2, 2A:
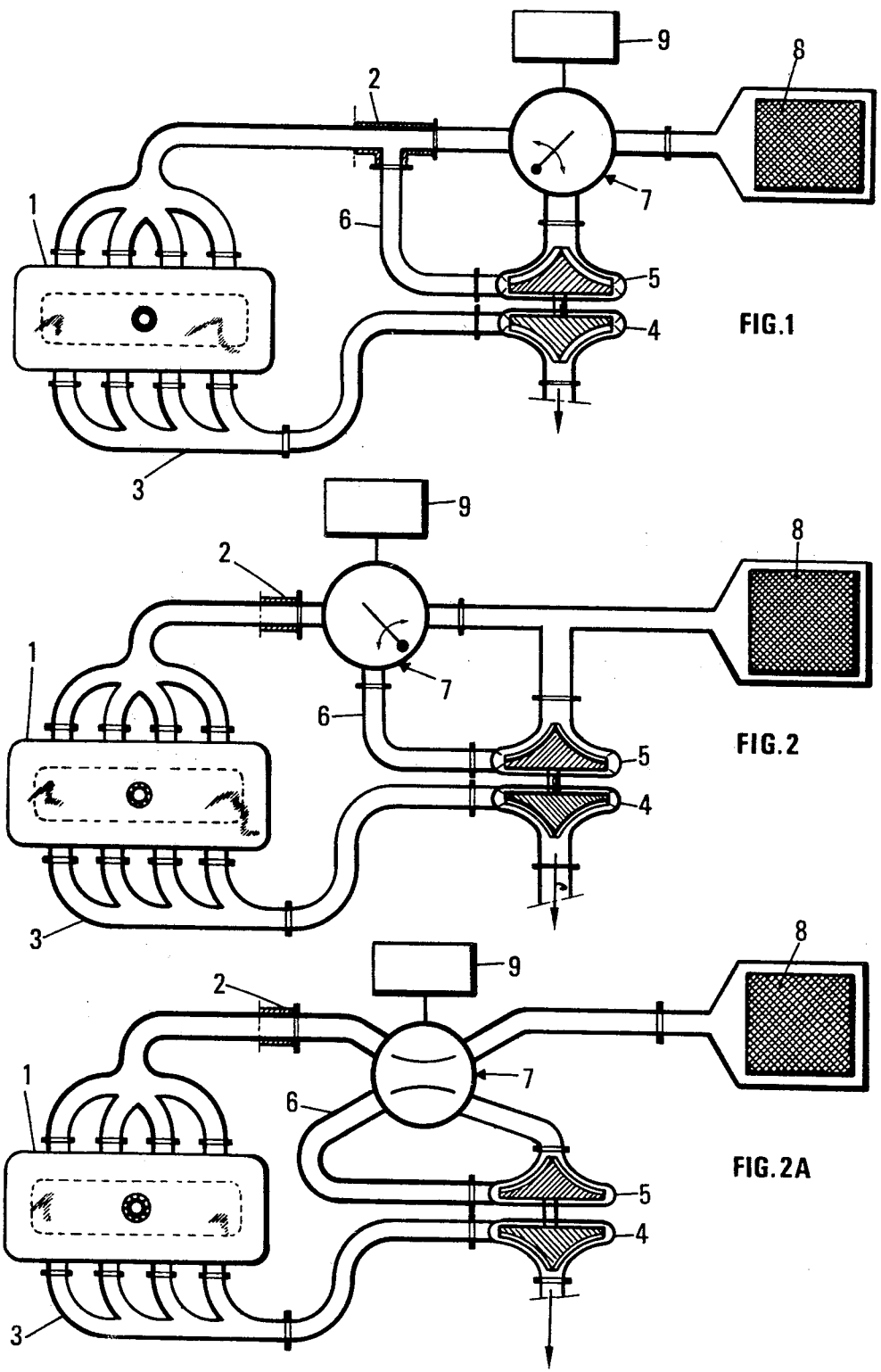

United States Patent [19]

Ecomard et al.

[11] 4,207,743
[45] Jun. 17, 1980

[54] METHOD AND DEVICE FOR IMPROVING THE OPERATION OF A SUPERCHARGED ENGINE

[75] Inventors: André Ecomard, Marly-le-Roi; Pierre Eyzat, Courbevoie, both of France

[73] Assignee: Institut Francais du Petrole, Rueil-Malmaison, France

[21] Appl. No.: 849,245

[22] Filed: Nov. 7, 1977

[30] Foreign Application Priority Data

Nov. 12, 1976 [FR] France .................. 76 34401

[51] Int. Cl.² .................. F02B 37/00; F02B 33/44
[52] U.S. Cl. .................. 60/611
[58] Field of Search .......... 60/600, 601, 605, 611; 123/119 C, 119 CE

[56] References Cited

U.S. PATENT DOCUMENTS

| | | | |
|---|---|---|---|
| 2,645,409 | 7/1953 | Lawler | 60/600 X |
| 3,018,617 | 1/1962 | Kelgard | 60/611 X |
| 3,049,865 | 8/1962 | Drayer | 60/611 |
| 3,651,636 | 3/1972 | Glassey et al. | 60/611 |
| 3,868,822 | 3/1975 | Keller | 60/611 X |

FOREIGN PATENT DOCUMENTS

| | | | |
|---|---|---|---|
| 1451898 | 7/1969 | Fed. Rep. of Germany | 60/611 |
| 2416287 | 10/1975 | Fed. Rep. of Germany | 60/611 |
| 109763 | 4/1925 | Switzerland | 60/611 |
| 186055 | 11/1936 | Switzerland | 60/611 |
| 382834 | 8/1973 | U.S.S.R. | 60/605 |

*Primary Examiner*—Michael Koczo
*Attorney, Agent, or Firm*—Craig & Antonelli

[57] ABSTRACT

The invention provides a method comprising the detection of the operating conditions of the engine and, depending on these operating conditions, supplying the engine with air either from a static source or from an air compressor.

When air is supplied to the engine from the static source the compression work of the compressor is kept at a minimum value, and shifting from one operating mode to the other is achieved within the shortest possible time interval.

11 Claims, 14 Drawing Figures

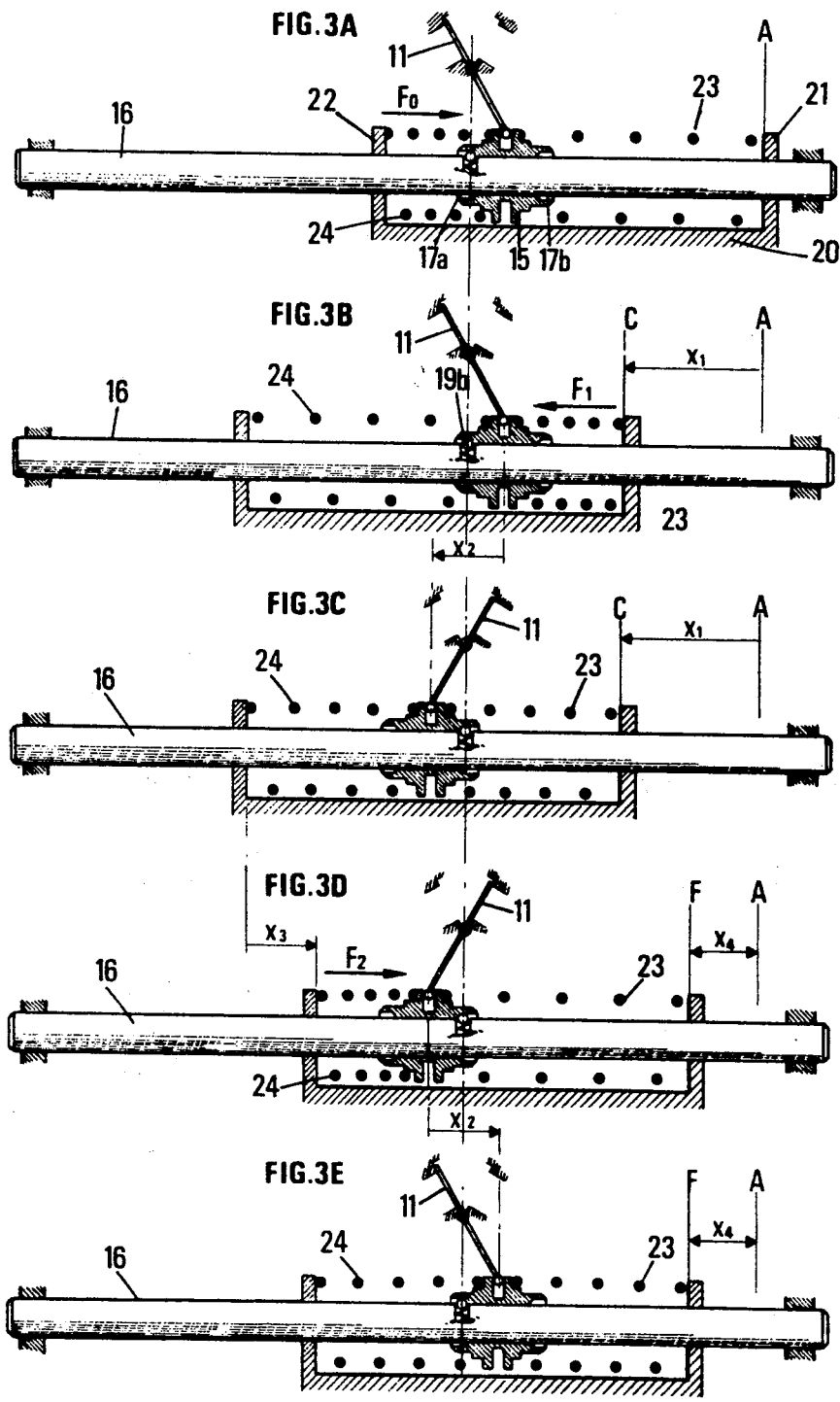

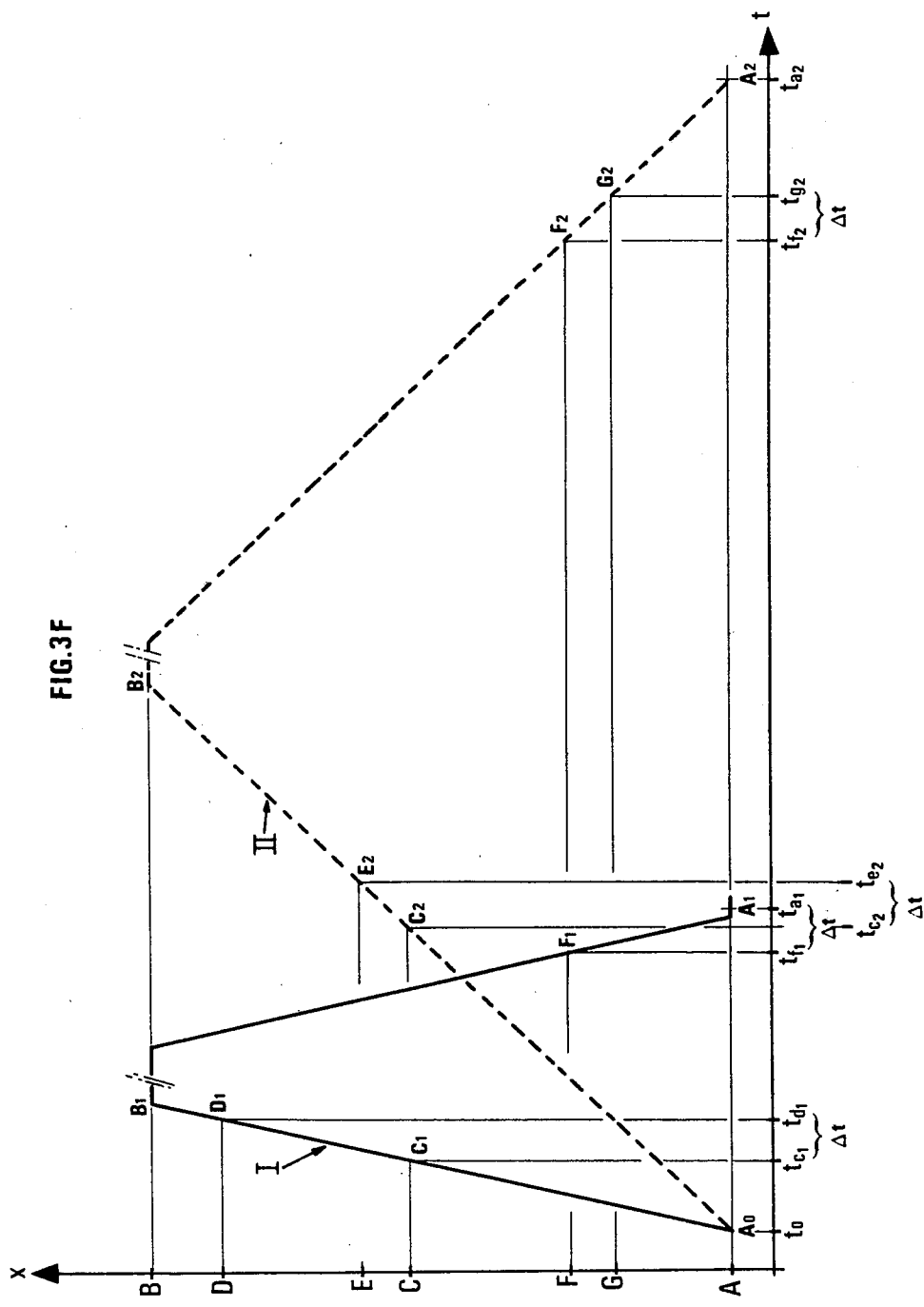

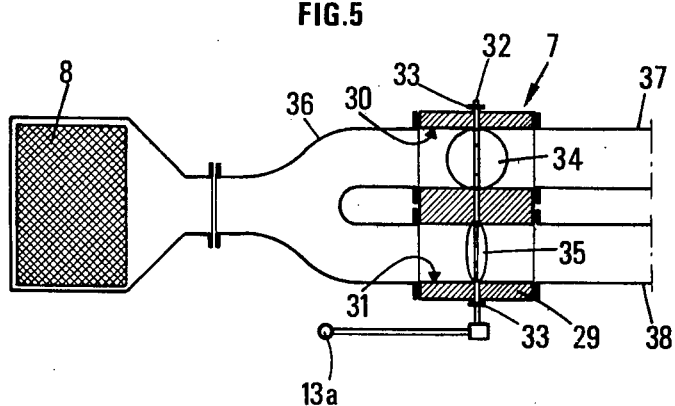
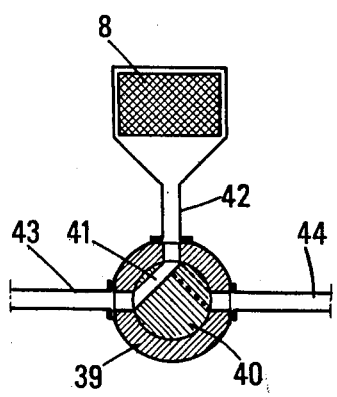

METHOD AND DEVICE FOR IMPROVING THE OPERATION OF A SUPERCHARGED ENGINE

This present invention relates to supercharged internal combustion engines, comprising an air compressor driven by a turbine which is actuated by the exhaust gases. By internal combustion engines it is meant not only spark ignition engines, but also compression ignition engines.

More precisely, the invention provides a method and a device for improving the operation of engines of the type referred to, by improving for example the acceleration capacity of such engines (particularly their ability to accelerate rapidly).

As it is well known, many advantages (such as a weight and volume reduction, a reduction in the fuel consumption, etc.) can be gained by substituting for an engine of high cylinder capacity a supercharged engine of a smaller cylinder capacity, which, under normal operating condition, and as soon as the rotation speed of the engine has reached a fixed value, can have maximum performances which are identical to those of an engine which is not supercharged. However a supercharged engine does not respond so fast to an acceleration as a non-supercharged engine having equivalent maximum performances and the difference in the performances of the two engine types is the greater as the cylinder capacity of the supercharged engine is smaller and as the engine speed is lower. This is a major drawback when a supercharged engine is used on a vehicle which should be able to accelerate rapidly, irrespective to the engine speed.

The object of the invention is, accordingly, to provide a device for improving the operation of supercharged engines equipped with a turbo-compressor, so as to obviate or at least strongly reduce some of the drawbacks of supercharged engines as used up to now.

Figure 3:
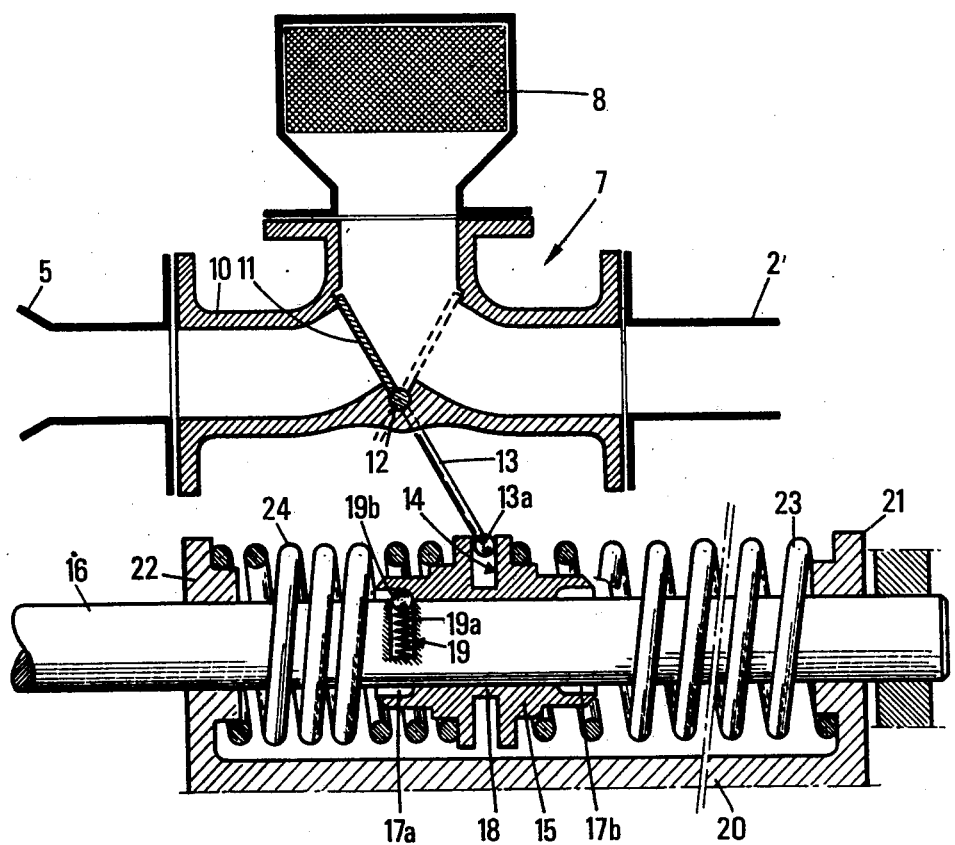
Figure 4:
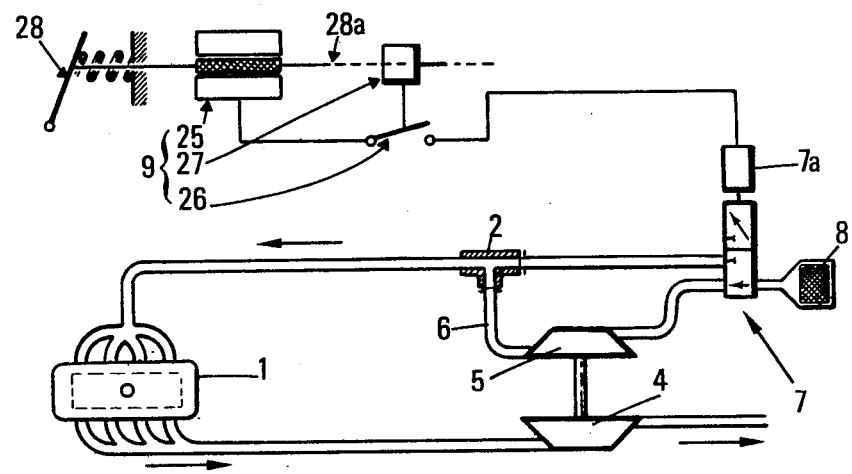

The invention will be better understood and all its advantages made apparent from the following description of different embodiments illustrated by the accompanying drawings wherein:

FIG. 1 diagrammatically illustrates a motor supercharged through a turbo-compressor equipped with the device according to the invention, FIGS. 2 and 2A illustrate alternative embodiments of the device of FIG. 1, FIG. 3 shows more in detail a non-limitative embodiment of the distributor and of the control device, FIGS. 3A to 3F illustrate the operation of the device, FIG. 4 diagrammatically illustrates another embodiment of the invention, FIGS. 5, 6 and 7 illustrate various embodiments of the distributor.

FIG. 1 diagrammatically illustrates an internal combustion engine 1 comprising an air intake pipe 2 and an exhaust pipe 3 for exhaust gases.

This engine may be a Diesel engine or a spark ignition engine, the air inlet being constituted in this latter case by the air inlet of a carburetor (not shown).

The engine 1 is supercharged through a turbo-compressor comprising a turbine 4 actuated by the exhaust gases and the turbine 4 drives an air compressor 5, for example of the centrifugal type, whose outlet communicates with the air intake 2 of the engine through a pipe 6 which will preferably be as short as possible and of a maximum diameter so as to reduce pressure drops in the air flow.

The operation of a supercharged engine is well known to those skilled in the art and will not therefore be described here.

Such operation of a supercharged engine can be improved by carrying out the following steps, in dependence with the values reached by at least one measured parameter representing the operating conditions of the engine:

(a) connecting the air inlet to a source capable of delivering air under a determined pressure which can be substantially constant, when the measured parameter reaches a first arbitrarily fixed value and maintaining the air compressor in such operating conditions that it delivers only a low compression power, (b) supplying the engine exclusively with air delivered by the compressor when said measured parameter reaches a second predetermined value different from said first value, the shifting from one operating condition to the other being performed within the shortest possible time interval.

A device for carrying out the method according to the invention is diagrammatically illustrated by FIG. 1. It comprises essentially distributor means 7, for example a three-way valve having two positions. In the illustrated embodiment, this distributor 7 is connected to the engine air inlet 2, to the inlet of compressor 5 and to the main air intake diagrammatically indicated by an air filter 8.

In a first position of the distributor, the air flows through distributor 7 from air filter 8 to the engine air intake 2, while the inlet of compressor 5 is completely obturated. As readily apparent from the foregoing the atmosphere constitues in this embodiment a source of air under a determined constant pressure when the distributor 7 is in its first position.

In a second position, the distributor 7 connects the air filter 8 with the inlet of compressor 5, and prevents simultaneously any communication between the air filter and the air intake 2.

A control element 9 actuates the distributor 7 in dependence with the value of at least one parameter representing the operating conditions of the engine. This parameter can be the position of the acceleration control means, such as the gas pedal, or any element associated therewith, such as linking rods, carburetor flat valve when the engine is of the spark ignition type. This parameter may also be the engine speed, the speed of displacement of the gas pedal, the pressure in the air intake duct, etc.

The way of operating the device according to the invention may vary substantially and the control element 9 must be designed accordingly.

A first way of operating the device according to the invention is illustrated by FIG. 1.

The control device 9 operates in dependence upon the value of a parameter which represents the operating conditions of the engine, being for example associated with the gas pedal or with the linking rods connected to the latter.

When the value of this parameter is lower than a threshold or limit-value $S_1$, control device 9 keeps distributor 7 in its first position wherein the compressor 5 does not supply air, as its inlet port is closed and the inlet opening of the engine is in communication with air filter 8. The engine then operates with natural air intake or suction. It has been ascertained that the rotation speed of compressor 5 which does not deliver air, is established at a value substantially higher than the value which would prevail with the compressor inlet port open.

When the value of the above parameter while varying in a first direction, reaches the threshold $S_1$, the control element 9 rapidly shifts the distributor 7 into its second position, wherein the engine is supercharged. It appears then that, due to the inertia phenomenon, the rotation speed of the compressor does not vary at once, which is favourable to a good supercharging of the engine, this speed increasing then progressively with the rotation speed of the engine.

When the value of the parameter reaches, while varying in a reverse direction with respect to the first one, a threshold $S_2$, the control element 9 restores the device 7 back to its first position.

Oscillating effects during the engine operation are avoided by giving to thresholds $S_1$ and $S_2$ different values.

Preferably, but not limitatively, the first threshold $S_1$ will be so selected as to correspond to an engine speed close to 60% of the maximum speed at the highest gear ratio, when the car travels on a flat road (at constant altitude).

It has also been ascertained that this rapid shifting of distributor 7 from one position to the other should preferably be effected within a time interval which is as short as possible, the minimum time interval being limited by the mechanical characteristics of the device (its inertia etc.) and the maximum time interval being limited to one third of the minimum time required by an operator to displace the gas pedal over its full stroke. Generally this time interval will range from about 0.1 second to 1 second.

FIG. 2 shows a first alternative embodiment of the device illustrated in FIG. 1, wherein, in a first position, the distributor closes the outlet of air compressor 5 and simultaneously connects the air intake 2 of the engine to the air filter 8, while in its second position it connects the outlet of compressor 5 with the engine air intake 2.

In an alternative embodiment illustrated by FIG. 2A, the distributor 7 is a four-way distributor with two positions, the first position connecting, on the one hand, the air filter 8 to the air intake 2 of the engine, and connecting, on the other hand, the inlet to the outlet of the compressor, while in its second position this distributor 7 connects the inlet of compressor 5 to air filter 8 and the outlet of this compressor to the engine intake 2.

According to an alternative mode of operating the engine, the control element 9 is adapted to maintain, during steady operating conditions, the distributor 7 in its position wherein the engine is supercharged through compressor 5, and to shift this distributor to its other position wherein the engine intake 2 is connected to air filter 8, when simultaneously the gas pedal is displaced rapidly during an acceleration and the operating point of the engine is within a preselected range. The control element 9 will then keep the distributor 7 in this last position for a fixed time interval. For example, the engine can be started in a position where the supply of air to the engine is from the static source and then shifting to a position where the engine is supercharged through the compressor 5. Alternatively, the engine can be started in the second position, i.e. supercharged through the compressor 5, and then shifted a exclusively a static source through the air filter 8.

Various embodiments of distributor 7 and of the associated control element 9 may be employed.

FIG. 3 diagrammatically illustrates a simple, strongly built and inexpensive embodiment of distributor 7 and of control element 9.

In this example, distributor 7 is actuated in dependence with the position of the acceleration control means, or gas pedal, the rotation speed of the engine being dependent on this position.

The distributor 7, which is of the type illustrated by FIG. 1, comprises a Y- or T-shaped hollow body member 10 whose ends are respectively connected with air filter 8, with the engine air intake 2 and with the inlet of compressor 5. A flap valve 11, located within the body 10 and hinged on a fixed shaft 12, can obturate one of the two arms of body member 10 connected to the engine intake 2 and to the inlet of compressor 5. Displacement of the flap valve 11 is effected through a control lever 13, whose end carries a roller 13a inserted in a groove 14, provided in a ring 15 which is axially displaceable along a stationary shaft 16. In the bore of ring 15 are provided grooves 17a and 17b separated by an abutment 18. Shaft 16 is provided with a radial bore 19 housing a calibrated spring 19a and a ball 19b which is adapted to co-operate with either of grooves 17a and 17b.

The control element 9 also comprises a movable member, or stirrup, 20, which is displaceable as the means controlling the acceleration (gas pedal) are actuated. This stirrup is for example displaced by translation through rod means (not shown) connected to the gas pedal. The stirrup 20 has two arm portions 21 and 22 traversed by shaft 16 and which, during the assembling, are positioned on both sides of ring 15. Springs 23 and 24 are positioned between ring 15 and arms 21 and 22 respectively.

FIGS. 3A to 3E show the mechanical operation of the assembly shown by FIG. 3. For sake of clarity, only flap valve 11, its articulation shaft 12, its control lever 13 and control element 9 are shown in the drawings.

FIG. 3A shows the position of the different elements when the acceleration control means (such as the gas pedal) are not actuated. Flap valve 11 is in its position corresponding to that diagrammatically shown in solid line in FIG. 3.

The assembly is so designed that spring 24 applies to ring 15 a greater force than that exerted by spring 23. The value of the resulting force F supported by ring 15 is $$|F_0| = |k_2 l_2 - k_1 l_1| \tag{1}$$

$k_1$ and $k_2$ being the respective stiffness coefficients of springs 23 and 24 and $l_1$ and $l_2$ being the respective compression lengths or these springs.

The force F directed towards the right side of FIG. 3A is transmitted to lever 13 which maintains the flap valve at its position shown in solid line in FIG. 3. In this position, ball 19b enters groove 17a, bearing against the abutment 18.

Under the above conditions, which correspond to a low rotation speed of the engine, the engine air intake 2 communicates with the air filter 8, so that the engine runs with natural intake or suction.

Upon actuation of the gas pedal so as to increase the engine speed, the stirrup 20 is moved to the left side of FIG. 3A over a corresponding length x. The resulting force applied onto ring 15 by springs 23 and 24 is first reduced, then nullified and thereafter increases in the reverse direction without causing the flap valve 11 to tilt. After a displacement $x_1$ the resulting force applied onto ring 15 reaches the value $F_1$ (FIG. 3B) for which spring 19a is calibrated.

At this instant (FIG. 3C) ring 15 is moved suddenly under the action of the force $F_1$ towards the left of the drawing over a length $x_2$, the ball 19b entering groove 17b. This causes tilting of flap valve 11 into its second position, shown in dotted line in FIG. 3, wherein the inlet of compressor 5 communicates with the air filter 8. From this position of stirrup 20, corresponding to the threshold $S_1$ in the operating range of the engine, the latter will be supercharged by compressor 5.

In this new position, the resulting force applied onto ring 15 by springs 23 and 24 is such that this ring cannot come back to its first position. An additional displacement of stirrup 20 towards the left of FIG. 3C causes an additional compression of spring 23 which keeps flap valve 11 in its position shown in dotted line in FIG. 3.

When the gas pedal is released, stirrup 20 is moved toward the right side of the drawing and the rotation speed of the engine decreases. Such movement reduces the compression of spring 23 and increases that of spring 24. When moving towards the right of the drawing, stirrup 20 reaches the position shown in FIG. 3C without causing the flap valve 11 to tilt. An additional displacement $x_3$ (FIG. 3D) increases up to the value $F_2$ the resulting force applied to ring 15.

At this time ring 15 is suddenly tilted to come back to its first position (FIG. 3E). From this position of stirrup 20, corresponding to a threshold $S_2$ in the engine operation, the engine 1 runs again with natural intake or suction.

As can be seen in FIGS. 3A to 3E, tilting of ring 15 from one position to the other can be obtained for different positions of stirrup 20, depending whether the car driver accelerates or decelerates the car.

For example, when using springs 23 and 24 having the same characteristics (same stiffness coefficient k, etc.) the difference $(l_2 - l_1)$, being designated by $x_0$, the value of force $F_0$ can be expressed as follows:

$$|F_0| = |k \cdot x_0|$$

If moreover spring 19a is so calibrated that $F_1 = F_0$ and the displacement of ring 15 is achieved over a stroke $x_2 = 0.5 x_0$, there is obtained $$x_1 = x_0 \text{ and } x_3 = 0.5 x_0.$$

Under these conditions, displacement of ring 15 during the acceleration periods (FIGS. 3B–3C) is initiated when stirrup 20 is at a distance $x_1 = x_0$ from its initial position illustrated by FIG. 3A, whereas backward movement of ring 15 to its initial position (FIG. 3D–3E) is initiated when stirrup 20 is at a distance $x_4 = 0.5 x_0$ from its initial position.

The curves of FIG. 3F show the displacement or stroke x of stirrup 20 as a function of time, this displacement being effected between points A and B when actuating the acceleration control means (gas pedal) so as to increase the engine speed, and from point B to point A when releasing the gas pedal.

Curve I in solid line corresponds to the fastest movement which can be imparted to stirrup 20 by a sudden action onto the gas pedal. Curve II in dotted line corresponds to a continuous but slower displacement of stirrup 20.

By comparing the two curves, which at the instant $t_0$ have the same origin $A_0$, it can be seen that stirrup 20 reaches points $C_1$, or $C_2$, corresponding to point C such that $AC = x_1$ (FIG. 3B) at the instants $t_{c1}$ or $t_{c2}$. If $\Delta t$ is the time the flap valve 11 requires for complete tilting, i.e. the time interval which is required by the ring for shifting from its position illustrating by FIG. 3B to that illustrated by FIG. 3C, it appears that on curve I tilting of the flap valve is achieved at point $D_1$ corresponding to the displacement AD of stirrup 20, while in the case of curve II this displacement is equal to AE, such that AE < AD.

On the other hand, during a deceleration, tilting of flap valve 11 begins at points $F_1$ and $F_2$ respectively, i.e. when stirrup 20 is at a distance $x_4 = AF$ from its initial position.

Since the time interval $\Delta t$ for tilting is dependent on the embodiment selected for distributor 7 and control element 9, the position of stirrup 20 wherein flap valve 11 begins to tilt will preferably be so selected, in order to obtain a smooth operation of the engine, that this tilting be completely achieved before stirrup 20 has been displaced over its maximum stroke, irrespective of the speed of its displacement, which may be expressed by the following relationship AD ≦ AB.

FIG. 5 shows a preferred embodiment of the distributor which comprises a body member 29 wherein are provided two cylindrical bores 30 and 31 with parallel axes. At right angles to said axes, the body member 29 is traversed by a control rod 32 which is rotatable about its axis and is kept in position for example by means of clips 33.

Two flap valves 34 and 35 positioned in the bores 30 and 31 are fast with the rod 32. These flap valves have shapes complementary to the section of the bores wherein they are housed and are located in two substantially perpendicular planes. Thus in the position of rod 32, illustrated in FIG. 5, flap valve 35 closes nearly completely the bore 31 while flap valve 34 opens nearly completely the passage through bore 30. A rotation of rod 32 of about 90° places flap valve 34 into its position of closure of bore 30 and flap valve 35 opens completely bore 31.

A first opening of each of bores 30 and 31 is connected to air filter 8 through a pipe 36, the second opening of bore 30 being connected through a pipe 37 to the intake 2 of the engine and the second opening of bore 31 communicating through a pipe 38 with the inlet of air compressor 5 when the distributor is in its position illustrated by FIG. 1.

When this distributor is located in its position illustrated by FIG. 2, pipe 36 is no longer in communication with air filter 8, but communicates with the engine intake 2, while pipe 37 is connected with air filter 8 and pipe 38 is connected with the outlet of the air compressor 5.

The control rod 32 is for example fast in rotation with lever 13 whose end 13a enters slot 14 of the ring 15, illustrated in FIG. 3.

FIG. 6 illustrates another embodiment of distributor 7 having three ways and two positions, this distributor comprising a tubular body member 39. This body member 39 is connected with the air filter 8 through a pipe 42, with the engine air intake 2 through a pipe 43 and with the inlet of compressor 5 through a pipe 44.

A barrel 40, wherein is provided a duct 41, is housed in the bore of body member 39, this barrel having a first position (shown in solid line in the drawing) wherein duct 41 connects pipes 42 and 43, and a second position (shown in dotted line) wherein pipes 42 and 44 are connected with each other.

FIG. 7 illustrates a distributor 7 of the same type as in FIG. 6, adapted to connect the inlet and outlet ports of the compressor in one of the positions of barrel 40, which then comprises to this end a second duct 46 connecting pipe 44 and a pipe 45 which is connected to the outlet of air compressor 5.

FIG. 4 diagrammatically shows another embodiment of the invention operating like the above-described embodiment.

The distributor 7 is formed by a three-way electrovalve having two positions, i.e. a first position shown in FIG. 4, wherein the air filter 8 communicates with the inlet of compressor 5 and a second position wherein the air filter 8 communicates exclusively and directly with the engine intake 2. This valve is actuated by electrical motor means 7a, energized by the control element which is indicated as a whole by reference 9. This control element comprises a detector 25 which delivers a signal when, on the one hand, the displacement of the acceleration control means 28 (gas pedal) is affected at a speed which is greater than a predetermined value and when, on the other hand, this displacement corresponds to an acceleration of the engine 1.

A simple, inexpensive and strongly built embodiment of the detector 25 is diagrammatically illustrated in FIG. 4. This detector comprises an electrical winding wherein is displaceable a magnetic core connected with rod means 28a associated with control lever 28.

Moreover a control means 27 associated with a switch 26 validates the action of detector 25 by enabling the signal produced by detector 25 to be transmitted to the motor means 7a exclusively when the displacement of the acceleration control means (gas pedal) has not reached a position corresponding to the above-indicated threshold $S_1$.

The operation of the device is simple: as long as the speed v of displacement of the gas pedal 28 has not reached a predetermined value $v_0$, corresponding to a fast acceleration, detector 25 delivers no signal. For a value equal to or greater than $v_0$ detector 25 produces a signal which can be transmitted to the motor means 7a only after its validation through control device 27. When at the same time as a signal is produced by detector 25, this signal is validated, the control device 27 keeps switch 26 in its position of closure, permitting transmission of this signal to the motor means 7a. The latter actuates the valve to place it in its second position. A time delaying element (not shown) which may be adjustable, maintains the valve in its second position during a time interval, then automatically positions the valve back to its second position.

The control device 27 can be of the position sensing type.

In the particular case of a spark ignition engine, the control device 27 may be constituted by a manometric gauge which is subjected to the pressure at the intake 2 of the engine and which opens switch 26 only when this pressure becomes at least equal to a preselected value which is lower than atmospheric pressure.

Modifications may of course be made without departing from the scope of the present invention. For example in one of its positions distributor 7 may connect the engine air intake 2 not directly to the air filter 8, but to a pressurized air accumulator having a loading pressure which is higher than atmospheric pressure. The load of this accumulator can be achieved through any suitable means which can be actuated by engine 1 or one of its accessories (battery, dynamo, alternator, etc.) during those time periods where the engine is not used at its full capacity.

The distributor 7 may also be constituted by a valve with a rotatable barrel, or also by a valve having a slide which is displaceable by a jack submitted to a fluid pressure.

The sensor forming the control means 9 may be of a type different from those illustrated by way of example in the drawings: for example, it will be possible to use a sensor of the type of an electronic revolution counter.

It will also be possible to use a control device comprising a sensor having a manometric gauge which actuates distributor 7 as a function of the pressure prevailing in the engine inlet pipe, this embodiment being more particularly suitable for a spark ignition engine.

We claim:

1. A method for improving the operation of an internal combustion engine having a turbine driven by the exhaust gases of the engine, and a compressor rotated by the turbine for delivering pressurized air at its outlet when its inlet is in communication with the atmosphere, the method comprising the steps of sensing the operating conditions of the engine and depending upon said operating conditions, subjecting the engine to one operating mode selected from a first and a second operating modes, said first operating mode corresponding to the supplying of air to the engine under a predetermined pressure exclusively from a static source while keeping low the compression work of the compressor, and said second operating mode corresponding to the supplying of air to the engine exclusively from the compressor, wherein, throughout the duration of said first operating mode, the inlet and outlet of the compressor are connected to each other.

2. The method according to claim 1 in which the engine is started with said first operating mode, further comprising the steps of shifting from said first operating mode to said second operating mode only when the operating conditions vary in a direction to reach first preselected conditions, and then shifting from said second operating mode, back to said first operating mode, when the operating conditions, vary in a reverse direction to reach second preselected conditions, wherein the operation conditions are sensed by measuring the value of at least one parameter representing engine operation, and wherein said first and second preselected operating conditions correspond, respectively, to first and a second threshold values of said at least one parameter, said first and second threshold values being different from each other.

3. The method according to claim 1, including the steps of starting the engine with the second operating mode and then successively shifting from said operating mode to said first operating mode, only as the operating conditions reach first predetermined conditions, then from said first operating mode back to said second operating mode, after a preselected time interval has elapsed from the time of shifting from said second to said first operating mode.

4. A method for improving the operation of an internal combustion engine having a turbine driven by the exhaust gases of the engine, and a compressor rotated by the turbine for delivering pressurized air at its outlet when its inlet is in communication with the atmosphere, the method comprising the steps of sensing the operating conditions of the engine and, depending upon said operating conditions, subjecting the engine to one operating mode selected from a first and a second operating modes, said first operating mode corresponding to the supplying of air to the engine under a predetermined pressure exclusively from a static source while keeping low the compression work of the compressor, and said second operating mode corresponding to the supplying of air to the engine exclusively from the compressor, wherein throughout the duration of said first operating mode, the inlet and outlet of the compressor are connected to each other, starting the engine with the second operating mode and then successively shifting from said second operating mode to said first operating mode, only as the operating conditions reach first predetermined conditions, then from said first operating mode back to said second operating mode, after a preselected time interval has elapsed from the time of shifting from said second to said first operating mode, and sensing the operation conditions of the engine by measuring the value of at least one parameter representing the operation of the engine with the first operating conditions corresponding to a first threshold value of said at least one parameter, wherein said at least one parameter is the value and direction of the speed of displacement of engine acceleration control means and wherein the engine operation is shifted from said second operating mode to said first operating mode when said speed of displacement has reached, while increasing, a first predetermined value upon acceleration and, simultaneously, engine rotation speed is lower than a preselected threshold value.

5. A device for improving the operation of an internal combustion engine having a turbine rotated by engine exhaust gases and a compressor driven by the turbine and having an inlet which can be connected to the atmosphere and an outlet which can be connected to the engine intake; distributor means having first and second positions, the first position connecting a source of air of determined pressure with the engine intake and maintaining the compression work of the compressor at a low value, and the second position connecting the engine intake exclusively with the compressor outlet; and control means operatively associated with said distributor means for rapidly shifting said distributor means between said first and second positions under predetermined engine operating conditions, wherein said distributor means in the first position connects the inlet and outlet of the compressor.

6. A device for improving the operation of an internal combustion engine having a turbine rotated by engine exhaust gases and a compressor driven by the turbine and having an inlet selectively connectable to atmosphere and an outlet selectively connectable to the engine intake; distributor means having first and second positions, the first position connecting a source of air of determined pressure with the engine intake and maintaining the compression work of the compressor at a low value, and the second position connecting the engine intake exclusively with the compressor outlet; and control means operatively associated with said distributor means for rapidly shifting said distributor means between said two positions under predetermined engine operating conditions, in which said control means is operable for automatically shifting said distributor means in dependence upon the value reached by at least one parameter representing the engine operating conditions, the engine being started with said distributor means in the second position, wherein said control means comprises a sensor means for delivering a control signal when said at least one parameter reaches a preselected value and said control means shifts said distributor means from said second position to said first position in response to said control signal and time delaying means for delaying by a preselected time interval the shifting from said second position to said first position.

7. A device according to claim 6, wherein said preselected value of said at least one parameter corresponds to the increasing engine rotation speed reaching a first preselected threshold value.

8. A device according to claim 7, wherein said sensor means is operable for measuring speed and displacement direction of the engine acceleration control means for validating the control signal, said validating means comprising interrupting means actuatable by a sensing element, said interrupting means having a closure position for transferring the control signal of the sensor means to said distributor means, wherein said sensing element is operable to maintain the interrupting means in the closure position as long as the stroke of the engine acceleration control means remains lower than a preselected limit value.

9. A device according to claim 7, where the engine is a spark ignition engine, said sensor means is operable for measuring the speed and displacement direction of the engine acceleration control means, further comprising means for validating said control signal, comprising an interrupting means actuatable by a sensing element, said interrupting means having a closure position for transmitting the control signal from the sensor means to said distributor means, said sensing element comprising a pressure sensor adapted to maintain the interrupting means in its closure position as long as the engine intake pressure is lower than a preselected value.

10. A device for improving the operation of an internal combustion engine having a turbine rotated by engine exhaust gases and a compressor driven by the turbine and having an inlet connectable to the atmosphere and an outlet connectable to the engine air intake; a distributor means having first and second positions, the first position connecting a source of air of determined pressure with the engine air intake and maintaining the compression work of the air compressor at a low value, and the second position connecting the engine air intake exclusively with the compressor outlet; and control means operatively associated with said distributor means for rapidly shifting said distributor means between said first and second positions under predetermined engine operating conditions, said control means being operable for automatically shifting said distributor means in dependence upon the value reached by at least one parameter representing the engine operating conditions, said control means comprising sensor means for delivering a first control signal when at least one parameter reaches a value as increasing engine speed reaches a first preselected threshold value and for delivering a second control signal when said at least one parameter reaches a value as decreasing engine speed reaches a second preselected threshold value, said control means shifting said distributor means from said first position to said second position in response to said first control signal and shifting said distributor means from said second position to said first position in response to said second control signal, said control further comprising a ring displaceable along a stationary shaft, a stirrup member movable in accordance with the displacement of the engine acceleration control means, said stirrup member having two arms positioned on either sides of said ring, calibrated spring means located between each arm of said stirrup members and said ring, and locking means comprising a ball and a calibrated spring housed in a radial bore of the stationary shaft, a groove provided in a bore of said ring, said ball engaging the groove provided in the bore of said ring and co-operating with an abutment located within said groove and integral with said ring, wherein said locking means prevents any displacement of said ring as long as the resultant of the forces applied by said calibrated spring means onto said ring does not reach a calibration value of said locking means.

11. A device for improving the operation of an internal combustion engine having a turbine rotated by engine exhaust gases and a compressor driven by the turbine and having an inlet selectively connectable to atmosphere and an outlet selectively connectable to the engine intake; distributor means having first and second positions, the first position connecting a source of air of determined pressure with the engine intake and maintaining the compression work of the compressor at a low value, and the second position connecting the engine intake exclusively with the compressor outlet; and control means operatively associated with said distributor means for rapidly shifting said distributor means between said two positions under predetermined engine operating conditions, wherein the air pressure delivered by the source is atmospheric pressure, said distributor means comprising a hollow member with three apertures, the first of said three apertures being connected with the compressor inlet, the second of said three apertures being connected with the engine intake and the third of said three apertures being connected to the atmosphere, a flap valve hinged on a stationary shaft of said hollow member, said flap valve completely closing said first aperture in a first position and completely closing said second aperture in a second position, and a control arm integral with said flap valve for displacement thereof, said control arm being driven by said control means.

* * * * *